United States Patent
Gourves

(10) Patent No.: US 8,005,604 B2
(45) Date of Patent: Aug. 23, 2011

(54) METHOD AND SYSTEM FOR ADJUSTING THE OPERATION PARAMETERS OF AN INJECTION THERMAL ENGINE WHILE REDUCING EFFLUENTS

(75) Inventor: Frederic Gourves, Cergy le Haut (FR)

(73) Assignee: Peugeot Citroen Automobiles SA, Velizy Villacoublay (FR)

( * ) Notice: Subject to any disclaimer, the term of this patent is extended or adjusted under 35 U.S.C. 154(b) by 147 days.

(21) Appl. No.: 12/518,066

(22) PCT Filed: Nov. 26, 2007

(86) PCT No.: PCT/FR2007/052399
§ 371 (c)(1), (2), (4) Date: Sep. 24, 2009

(87) PCT Pub. No.: WO2008/071890
PCT Pub. Date: Jun. 19, 2008

(65) Prior Publication Data
US 2010/0036586 A1 Feb. 11, 2010

(30) Foreign Application Priority Data
Dec. 8, 2006 (FR) .................. 06 55396

(51) Int. Cl.
*F02D 41/26* (2006.01)

(52) U.S. Cl. .......................................... 701/103

(58) Field of Classification Search .......... 701/103–105, 701/110, 111
See application file for complete search history.

(56) References Cited

U.S. PATENT DOCUMENTS

| 5,870,688 A * | 2/1999 | Kanbara et al. ........... 701/110 |
| 6,173,698 B1 | 1/2001 | DeGroot et al. |
| 6,212,879 B1 | 4/2001 | Nishimura et al. |

FOREIGN PATENT DOCUMENTS

EP 0896149 A 2/1999

OTHER PUBLICATIONS

International Search Report of PCT/FR2007/052399 mailed Jun. 3, 2008.

* cited by examiner

*Primary Examiner* — Hai H Huynh
(74) *Attorney, Agent, or Firm* — Nicolas E. Seckel

(57) ABSTRACT

The invention relates to a method for adjusting the operation parameters of an injection internal combustion engine (10), that comprises the following steps: setting a stability setpoint Ss, calculating an engine stability index Is, calculating the stability deviation Es equal to the difference between the stability setpoint Ss and the stability index Is, processing the stability deviation Es using a regulator (18) that provides an setpoint to be applied to one of the engine operation parameters, said parameter being selected by a calculator (20) or supervisor that controls the adjustment so that the corrective action applied optimizes the effluent level and/or the thermal energy available at the exhaust while respecting the stability setpoint Ss.

17 Claims, 3 Drawing Sheets

METHOD AND SYSTEM FOR ADJUSTING THE OPERATION PARAMETERS OF AN INJECTION THERMAL ENGINE WHILE REDUCING EFFLUENTS

The present invention relates to a method and a system for regulating the operation of an internal combustion engine that makes it possible to reduce the pollutant emissions therefrom.

In view of reducing pollutant emissions overall, emissions must be reduced directly, i.e., emissions at the source, exiting the cylinder, and indirectly, by optimizing the operation of a catalyst device located in the exhaust gas circuit.

Actually, such a device, commonly called a catalyst or catalytic container, operates only above a certain temperature, commonly greater than 400° C. As a reminder, the catalyst is an emissions reduction device that uses the principle of catalysis to transform carbon monoxide (CO), unburned hydrocarbons and nitrogen oxides (NOx) into water, nitrogen and carbon dioxide.

Thus, as long as the catalyst is not activated, from not having reached its optimal operating temperature, pollutant emissions remain elevated. It has been estimated that currently, for a standardized cycle, a vehicle discharges up to 90% of total pollutant emissions during the first tens of seconds of engine operation.

The invention thus has a dual objective: to reduce gross pollutant emissions, i.e., those exiting the cylinder, and to accelerate heating of the catalyst so as to minimize the time during which the latter is inactive.

The purpose of the invention is thus to maximally reduce gross emissions while also having the greatest possible thermal power in the exhaust stream so as to activate the catalyst very quickly.

Internal combustion engines with fuel injection feature a number of operating parameters that have an influence on a) emissions at the source and b) thermal energy in the exhaust stream. Examples of these parameters are:

engine richness, which expresses the proportion of the air/fuel mixture being injected into the engine. It is defined as the ratio between air and fuel quantities in the mixture injected into each cylinder. Richness is a value generally between 0.8 and 1.2, with 1 corresponding to the stoichiometric mixture for which the quantity of oxygen contained in the air/fuel mixture is exactly the quantity needed for complete oxidation of the fuel.

spark advance, which makes it possible to influence the thermal energy in the exhaust stream. Spark advance is defined by the distance between the ignition sparked by the spark plug and top dead center (TDC), measured at the crankshaft and expressed in crank-angle degrees.

valve overlap, which corresponds to the period during which the intake and exhaust valves are open at the same time.

Currently, the calculators used on mass-production engines integrate most of these parameters, whose values are defined in such a way as to obtain the best compromise between engine robustness and pollutant emissions levels. However, for the most part, they use fixed adjustments plotted on a graph.

These parameters have different influences on engine operation, especially on output and stability. In particular, acting on one or another of these parameters can badly diminish engine stability, which is detrimental both to the motorist's comfort and engine operation and durability. For optimal engine operation, engine stability must be taken into account by the management system according to the invention.

The present invention thus proposes a system for managing the operating parameters of a fuel-injection heat engine that will make it possible to simultaneously reduce gross pollutant emissions and optimize heating of the catalyst device, using actual engine stability as a basis to determine the corrections to be made.

The invention thus relates to a method for regulating the operating parameters of a fuel-injection internal combustion engine, comprising the following steps:

establishing a stability setpoint, calculating an engine stability index, calculating the deviation in stability, equal to the difference between the stability setpoint and the stability index, processing the stability deviation using a regulator that provides the correction to be applied to one of the engine operating parameters, this parameter being selected by a calculator that controls parameter regulation in such a way that the corrective action taken optimizes pollutant emissions levels and/or the available thermal energy in the exhaust stream.

This way, with the invention, all of the engine operating parameters, and particularly those described above, can be set with actual engine behavior taken into account. This makes it possible to act on all of the available parameters in order to decrease pollutant emissions levels at the source and reduce the catalyst heating time by optimizing the available thermal energy in the exhaust stream. The stability condition ensures smooth engine operation by allowing for manufacturing disparities in engines, fuel quality differences, engine wear and tear, etc.

In an embodiment, each parameter varies within an interval defined by two threshold values.

In an embodiment, when one parameter reaches a threshold value as the result of a first corrective action, the calculator that controls parameter regulation then selects another parameter for which a setpoint will be similarly determined and applied.

In an embodiment, the calculator that controls parameter regulation selects all of the engine operating parameters on which a corrective action can be taken, one after another, with the parameter selection order being determined by the influence of each of these parameters on pollutant emissions and/or the available thermal energy in the exhaust stream.

In an embodiment, the regulator is a PID-type regulator.

In an embodiment, for each parameter addressed, the supervisor can implement an emergency strategy if the stability setpoint is not maintained.

In an embodiment, the parameter to be addressed is selected from the group comprising: engine richness, spark advance, valve overlap.

The invention also relates to a control system for a fuel-injection internal combustion engine that implements the above-defined method.

The invention will be more easily understood from the detailed description of an example of an embodiment, given with reference to the figures, in which.

Figure 1:
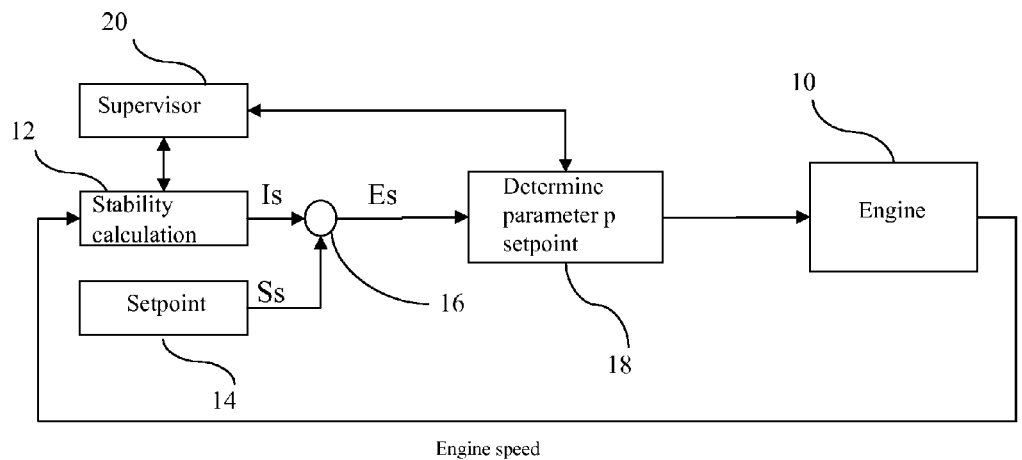
FIG. 1 is a general block diagram of the method according to the invention.

FIG. 1 describes the implementation of the method according to the invention using block diagrams. The engine stability 10 is determined by a function 12 that produces a stability indicator Is. A calculator 14 provides a stability setpoint Ss, in particular by using an engine-specific plotted graph. A comparator 16 calculates the difference between the two values Ss and Is in order to produce an output signal Es, called the stability deviation or error.

The stability deviation Es is sent next to a regulator 18, which in the example is a PID-type regulator (proportional-integral-derivative), but can be any other type (LQ, Hinfini, etc.). A calculator 20, known as a supervisor, tells the regulator 18 for which engine operating parameter p a corrective action must be taken. The regulator then uses the stability deviation to calculate a setpoint Sp for the parameter p. This setpoint is transmitted to the engine control member in order to be applied.

The engine stability is determined from multiple indicators that estimate combustion quality:

$1^{st}$ case: the indicated mean torque IMT is calculated using the following formula:

$$IMT = J_{eng} \times \frac{d\omega_{eng}}{dt} + FTE(\text{plot})$$

Where:
Jeng: engine inertia (kg.m$^2$)
ωeng: engine speed (rad.s$^{-1}$)
FTE: frictional torque of the engine, determined by engine management as a function of engine speed, water and oil temperatures, and pressure.

From this calculation, multiple tests can be run to verify whether combustion is on target, such as verifying whether:
the derivative of the IMT is above a threshold
the IMT setpoint requested by the engine management is maintained $2^{nd}$ case: A value Ind_stab is determined from the following formula:

$$\text{Ind\_stab} = \frac{EnginePeriod_n - EnginePeriod_{n-1}}{EnginePeriod_n}$$

This calculation can advantageously be averaged over several points in order to perform a low-pass filtration.

The various tests make it possible to define the stability indicator Is that will be used by the regulator that acts on the spark advance setpoint, the richness setpoint, and the valve overlap value.

We saw that the supervisor 20 is the element that determines the parameter on which a corrective action will be applied. This parameter is selected based on its influence in reducing gross pollutant emissions and its influence on the available thermal energy in the exhaust stream. Now, the parameters that can be selected do not all have the same influence, which constitutes a first selection criterion. The supervisor thus has the role of selecting the parameters from a list ordered by influence from most influential to least; then, when corrective action is not possible (e.g., because it is already maximized), its role is to select the next parameter in the list. The order of the parameters on this list will be different depending on whether priority is to be given to reducing gross emissions, increasing the available thermal power in the exhaust stream, or else a compromise between the two.

Figure 2:
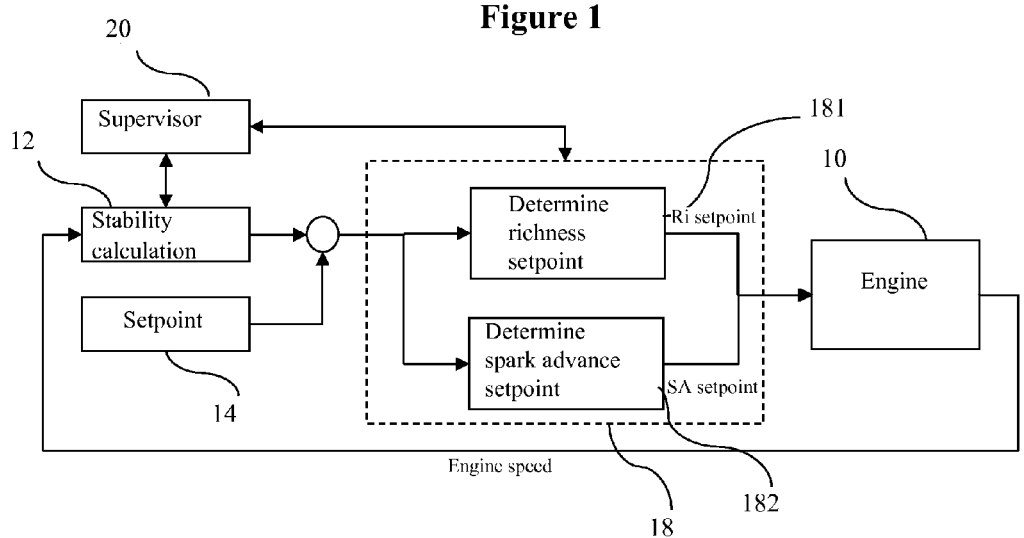
FIG. 2 represents a specific embodiment of the invention.

FIG. 2 describes an embodiment of the system described in FIG. 1, in which the regulator can regulate the following parameters: richness level, degradation of spark advance, with valve overlap being determined in the example by plotting it as a function of the spark advance value. In FIG. 2 the same elements are found as in FIG. 1. However, it can be seen that the regulator 18 comprises multiple modules 181, 182, with each of these modules being assigned to calculate the setpoint of one of the two regulated parameters. In the example, the regulator 18 comprises two calculation modules, but in the invention, the regulator 18 comprises as many calculation modules as parameters that must be regulated.

The supervisor must determine which parameter to act upon according to the stability level, but also the stability history. The supervisor gives the order to act on the various parameters sequentially, beginning with the parameter whose correction will have the greatest impact on the level of gross pollutant emissions and/or the available thermal energy in the exhaust stream.

Figure 3:
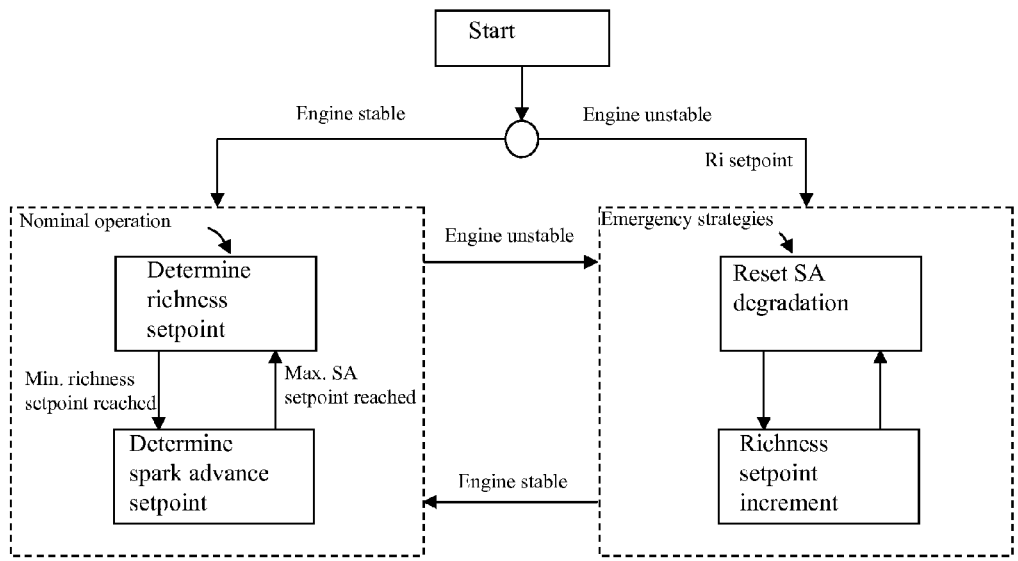
FIG. 3 represents an example of a parameter regulation strategy implemented by the system according to the invention, FIGS. 4 and 5 each represent a calculation module of the regulator in FIG. 2.

The three parameters used in the example have different influences, which can be evaluated as follows:
richness level Ri: if the richness is greater than 1, influence will be primarily on unburned hydrocarbon (HC) emissions. If the richness is less than 1, this influences nitrogen oxide (NOx) emissions. Thus, the compromise lies in a value close to 1, but with the drawback that a value greater than 1 is a detriment to the available thermal power in the exhaust stream.
degradation of spark advance: this parameter has a predominant influence on the available thermal energy in the exhaust stream, but conversely, has little impact on emissions at the source.
valve overlap: this parameter influences combustion stability, and also to a lesser degree, pollutant emissions at the source FIG. 3 shows a workflow example for the engine control strategy implemented with the system according to the invention.

This is a case where the engine is stable immediately after starting. The supervisor 20 thus instructs the control module 181, which is assigned to calculate the richness setpoint, to determine a more suitable richness level, i.e., a lower one, that will make it possible to reduce unburned hydrocarbon HC emissions and optimize heating of the catalyst in order to speed up its activation.

As long as the engine remains stable (with respect to the stability setpoint), the control process will decrease the richness setpoint until it reaches a lower limit, e.g., a value of 1. When the richness setpoint is at its limit, it is no longer possible to act thereupon, and the supervisor will instruct the module 182 to determine the most suitable spark advance so as to further increase the available energy in the exhaust stream. The valve overlap (via camshaft phasers) is determined in the example simply by plotting it as a function of the spark advance value.

If the engine then becomes very unstable, one can devise the system so that it activates emergency strategies, e.g., involving a spark advance reset, and if that is not adequate, a significant increase in the richness setpoint. When implementation of emergency strategies has reestablished an acceptable stability level, the system applies a normal control process once again.

Figure 4:
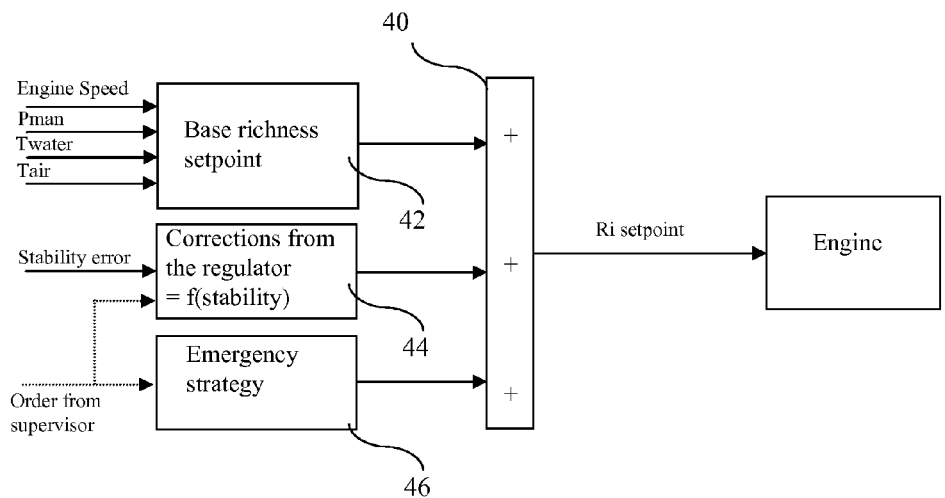

FIG. 4 describes the richness setpoint Sri regulation function employed in module 181. This calculation module 181 integrates a summing function 40. The latter also comprises three functions 42, 44 and 46 responsible for determining, respectively: a base richness setpoint, a richness correction (a function of the stability deviation), and an emergency setpoint. Thus, one or more of these functions 42, 44 and 46 are active depending on the strategy set by the supervisor 20.

Based on the orders sent by the supervisor 20, the richness setpoint Sri output from the function 40 can be determined:

- by a single open loop (plotting it as a function of the water temperature, for example). In this case, the adder 40 only takes into account the output signal of the function 42, i.e., the base richness setpoint.
- by an open loop added to PID-type regulation, for example, which determines a correction as a function of the stability error. Richness is regulated by the function 44, which can be a PID-type function, for example. In this case, the adder 40 uses the output signals provided by the two functions 42 and 44 (base richness setpoint and richness correction).
- by an emergency strategy (a significant increment over the open loop, for example). In this case, the adder 40 uses the output signals from the functions 42 and 46 (base richness setpoint and emergency setpoint).

Figure 5:
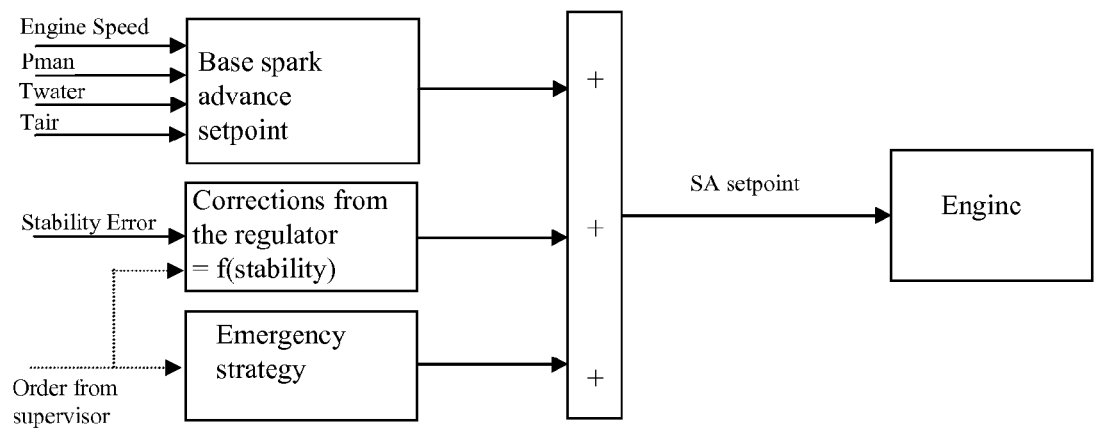

FIG. 5 shows the operation of module 182, which is assigned to calculate a spark advance setpoint. Its operation is identical to that of module 181, mutatis mutandis. The invention is implemented with as many modules of this type as there are parameters needing to be regulated.

The invention claimed is:

1. Method for regulating the operating parameters of a fuel-injection internal combustion engine, comprising the following steps:
    - establishing a stability setpoint Ss,
    - calculating an engine stability index Is,
    - calculating the stability deviation Es, equal to the difference between the stability setpoint Ss and the stability index Is,
    - processing the stability deviation Es using a regulator that provides a setpoint to be applied for one of the engine operating parameters, this parameter being selected by a calculator (20) or supervisor that controls parameter regulation in such a way that the corrective action taken optimizes pollutant emissions levels and/or the available thermal energy in the exhaust stream, while also maintaining the stability setpoint Ss,
    - the method being such that, with each parameter varying within an interval defined by two threshold values, when one parameter reaches a threshold value as the result of a first corrective action, the calculator that controls parameter regulation then selects another parameter for which a setpoint will be similarly determined and applied.

2. Method according to claim 1, wherein the calculator that controls parameter regulation selects all of the engine operating parameters on which a corrective action can be taken, one after another, with the parameter selection order being determined by the influence of each of these parameters on pollutant emissions and/or the available thermal energy in the exhaust stream.

3. Method according to claim 2, wherein the regulator comprises a PID-type regulator.

4. Method according to claim 3, wherein, for each parameter addressed, the calculator can implement an emergency strategy if the stability deviation is too great.

5. Method according to claim 4, wherein the parameter addressed is selected from the group comprising: engine richness, spark advance, valve overlap.

6. Method according to claim 3, wherein the parameter addressed is selected from the group comprising: engine richness, spark advance, valve overlap.

7. Method according to claim 2, wherein, for each parameter addressed, the calculator can implement an emergency strategy if the stability deviation is too great.

8. Method according to claim 7, wherein the parameter addressed is selected from the group comprising: engine richness, spark advance, valve overlap.

9. Method according to claim 2, wherein the parameter addressed is selected from the group comprising: engine richness, spark advance, valve overlap.

10. Method according to claim 1, wherein the regulator comprises a PID-type regulator.

11. Method according to claim 10, wherein, for each parameter addressed, the calculator can implement an emergency strategy if the stability deviation is too great.

12. Method according to claim 11, wherein the parameter addressed is selected from the group comprising: engine richness, spark advance, valve overlap.

13. Method according to claim 10, wherein the parameter addressed is selected from the group comprising: engine richness, spark advance, valve overlap.

14. Method according to claim 1, wherein, for each parameter addressed, the calculator can implement an emergency strategy if the stability deviation is too great.

15. Method according to claim 14, wherein the parameter addressed is selected from the group comprising: engine richness, spark advance, valve overlap.

16. Method according to claim 1, wherein the parameter addressed is selected from the group comprising: engine richness, spark advance, valve overlap.

17. Control system for a fuel-injection internal combustion engine, implementing the method according to claim 1.

* * * * *